United States Patent
Langheinrich et al.

(10) Patent No.: US 6,654,725 B1
(45) Date of Patent: Nov. 25, 2003

(54) SYSTEM AND METHOD FOR PROVIDING CUSTOMIZED ADVERTISING ON THE WORLD WIDE WEB

(75) Inventors: Marc Langheinrich, Tokyo (JP); Atsuyoshi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/436,241

(22) Filed: Nov. 9, 1999

(30) Foreign Application Priority Data

Nov. 9, 1998 (JP) .......................................... 10-317699

(51) Int. Cl.⁷ .............................................. G06F 17/60
(52) U.S. Cl. ...................................................... 705/14
(58) Field of Search .................. 705/1, 10, 14, 705/26

(56) References Cited

U.S. PATENT DOCUMENTS

| | | | |
|---|---|---|---|
| 5,619,709 A | 4/1997 | Caid et al. ................... | 395/794 |
| 5,893,111 A * | 4/1999 | Sharon, Jr. et al. ......... | 707/104 |
| 6,134,532 A * | 10/2000 | Lazarus et al. ............... | 705/14 |
| 6,286,005 B1 * | 9/2001 | Cannon ...................... | 707/100 |

FOREIGN PATENT DOCUMENTS

| JP | 9-134371 | 5/1997 |
|---|---|---|
| JP | 10-240828 | 9/1998 |

OTHER PUBLICATIONS

"W3.com introduces powerful web site advertising management software", Oct. 2, 1996, Business Wire, p10021060.*
D. Kristol and L. Montulli, RFC2109: HTTP state management mechanism. Network Working Group, IETF, (Feb. 1997).
T. Berners–Lee, R. Fielding, and H. Frystyk, RFC1945: Hypertext Transfer Protocol—HTTP/1.0 IETF, (May 1996).

* cited by examiner

Primary Examiner—Jeffrey D. Carlson
(74) Attorney, Agent, or Firm—Foley & Lardner

(57) ABSTRACT

A system and method for customized advertisement selection and delivery on the World Wide Web (WWW) upon the Internet. The advertising system has a database server which stores advertisements and their campaign information, and an advertisement server which generates electronic advertisements available to a client system. In the system, a customization process which customized the electronic advertisements to be delivered to each client system is performed. A user connects to a web site and is presented with an editorial page or a list of search results. The system inserts a customized advertisement into the page that matches the page content or search topic. No identifiable data is collected during the interaction with the user. Advertisers can specify display constraints for each advertisement. The system will adapt all unrestricted parameters in order to maximize the user's click-through probability.

20 Claims, 9 Drawing Sheets

SYSTEM AND METHOD FOR PROVIDING CUSTOMIZED ADVERTISING ON THE WORLD WIDE WEB

BACKGROUND OF THE INVENTION

1. Field of the Invention

The present invention relates to a system and method suitable for remote selection and delivery of customized contents such as advertisements, and particular to a system and method used to increase web advertisement response rates by providing customized advertisements shown as inline images and banners in web pages.

2. Description of the Related Arts

Nowadays, the Internet is very popular with the consuming public and WWW (World Wide Web) pages on the Internet are considered powerful media for advertising. In its simplest form, web advertisement is directly linked as fixed inline images into a web page. More flexible systems allow a separation of advertisement selection and placement, but offer only a random selection mechanism. This is possible since web documents do not contain images directly, but carry only a reference to the image itself. By having this reference not point to an actual image, but to an automated selection process, such a referenced inline image can be selected as late as the time the actual layout of the page is being made in the user's browser window. Moreover, each user who requests the page for display will potentially see a different inline image since the selection process is called for each user individually.

As an extension to this basic mechanism, many systems in use today (such as AdForce by AdForce, Inc. or AdKnowledge by AdKnowledge, Inc.) allow advertisers to specify targeting constrains that limit the display of an advertisement banner to certain conditions, such as the type of browser software used or the time of the day. Such a system first filters out all non-applicable advertisements given the condition of the current request for a banner. The remaining advertisements will then be selected randomly. Typical features include: type and version of browser software, operating system (OS), site originating the request, country, time of day, day of week. Several systems increasingly attempt to link such connection specific information to user specific data such as age, gender, income, place of residence, etc.

Japanese Patent Laid-Open Application No. 134371/97 (JP, 09134371, A) discloses an information retrieve system in which a search engine server and an advertisement server are provided independently on the Internet and, when a user issues a query to the search engine server through a client terminal, the advertisement server sends advertisement information relevant to the query to the client terminal.

Japanese Patent Laid-Open Application No. 240828/98 (JP; 10240828, A) discloses an advertisement distribution service system in which a CD-ROM (compact disc read only memory) including various advertisements is distributed to each user, dynamic log data of the user access is recorded by a center system, and an advertisement selected by the center system based on the dynamic log data is read from the CD-ROM and displayed on a terminal screen of the corresponding user.

Latest versions of advertisement selection systems (such as DART by DoubleClick, Inc.) offer simple click-boost mechanisms that, on top of the feature filtering mechanisms described above, keep statistics on how well each advertisement performed under the present conditions. Once a pool of available advertisements has been filtered out, the advertisement with the highest click-through will be selected. Others identify each user using a "cookie" (See Kristol, D. and Montulli, L. *RFC2109: HTTP state management mechanism.* Network Working Group, IETF, February 1997) (RFC=Request for Comments, and IETF=Internet Engineering Task Force) and limit the amount of times the same advertisement is shown to prevent "banner wearout". A cookie is a short piece of information, typically a user ID, that is sent by the server together with the requested page or image. The user's browser will store this information and resubmit it whenever the user requests a page or an image from the same server.

Finally, a few systems (such as the Accipiter AdManager from Engage or SelectCase for Ad Servers from Aptex, Inc.) combine neural network technologies (as described by Caid, W. et al. in U.S. Pat. No. 5,619,709, System and Method of context vector generation and retrieval. Apr. 8, 1997) with individual user identification to create fully personalized advertisement placement, observing every single web page a user requests and thus accumulating an online interest dossier on each user.

Many of the methods described above are too simple to take advantage of the just-in-time selection and delivery process of Web advertisement. Filtering techniques allow for a very precise targeting, but leave the task of selecting whom to target what advertisement to largely to the advertiser. This requires extended efforts on the advertiser side, who has to rely on countless statistics and demographic studies.

Although personalized advertisement delivery seems to solve this problem, the high amount of user monitoring clashes with an individuals need for privacy. Moreover, such intrusive techniques have not yet been proved to be effective in boosting click-through rates. However, one of the largest drawback of such systems using neural network technology is their inability to take display constraints, such as the minimum number of impressions to be shown for each advertisement, into account when selecting the best matching advertisement.

SUMMARY OF THE INVENTION

An objective of the present invention is improving the system for providing customized advertisement selection and delivery on the network.

Another objective of the present invention is improving the method for providing customized advertisement selection and delivery on the network.

The first objective of the invention is achieved by an apparatus which provides electronic advertisement to a client system coupled to the apparatus, the apparatus comprising: a database which stores advertisements and their campaign information; an advertisement server which generates electronic advertisement available to the client system; and means for performing a customization process which customizes the electronic advertisements to be delivered to each client system.

The other objective of the present invention is achieved by a method of providing electronic advertisements to a client system, the method comprising the steps of decoding customization parameters embedded in a request from the client system, querying a database for a list of display probabilities for relevant values of the customization parameters, computing an overall display probability for the overall request, and selecting an advertisement according to the display probability.

The other objective of the present invention is also achieved by a method for querying a database for a list of display probabilities for relevant values of given customization parameters, the method comprising steps of: providing a learning system which pre-computes the display probabilities; and periodically updating display probabilities by the learning system.

The present invention is directed to a system serving customized advertisements on-demand over the Hypertext Transfer Protocol (HTTP). A user connects to the system indirectly by downloading a content page from a publisher which contains a reference to an inline image. This image is then requested by the browser, transparent to the user, directly from the system described here. The system uses a pre-computed, periodically updated table of display probabilities which prescribe a distribution for the available advertisements given the current conditions. By making a choice according to the obtained distribution the system will return a customized banner advertisement to the user's browser.

The overall system architecture according to the present invention allows distributed advertisement delivery. All components can either be at a single centralized location or on different machines and in different places. Although cookies can be used to help session identification, they are not necessary for operation. Most importantly, the system is able to automatically adapt to usage pattern. Advertisers simply have to register their advertisement with the system and can leave advertisement targeting to the automated learning system. However, the advertiser remains in full control by being able to specify an arbitrary number of display constraints. The system will attempt to maximize the click-through for each single advertisement by relying on past experience. Performance can further be increased by grouping related advertisements into families and selecting among families instead of single advertisements.

The above and other objects, features, and advantages of the present invention will be apparent from the following description referring to the accompanying drawings which illustrate an example of a preferred embodiment of the present invention.

DESCRIPTION OF THE PREFERRED EMBODIMENT

Figure 1:
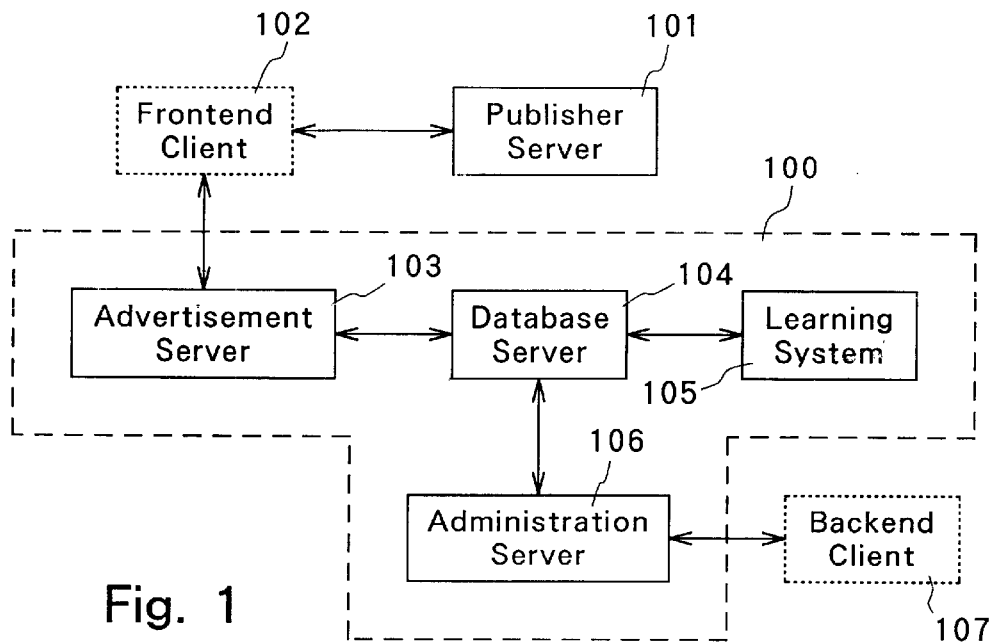
FIG. 1 is a block diagram showing the main components of the advertising system according to a preferred embodiment of the present invention and their environment.

As shown in FIG. 1, the advertising system 100 according to a preferred embodiment of the present invention consists of four main components, that is, an advertisement server (ad server) 103, a database server 104, a learning system 105 and a maintenance server (administration server) 106. All main components (servers 103, 104 and 106, and system 105) can be located on different machines in different physical locations, or even run on a single machine. The system interacts with a user's frontend client system 102 such as but not limited to a system on which standard Web browser software runs. The frontend client system 102 originally interacts with a publisher's server 101. On the backend side advertiser's can use a backend client system 107 such as but not limited to a system on which a standard web browser software runs. The backend client system 107 is connected to the administration server 106, which offers access to the main database.

The advertisement server 103 handles incoming requests from clients to deliver customized advertisements. It contacts the database server 104 in order to obtain the data relevant to make an advertisement selection. It is to be noted that the database server 104 together with its database API (application program interface) 118 (FIG. 2) are not part of the present invention but can be any standard database system. The current embodiment uses a relational database product, but persons skillful in the art will realize that other forms of database systems can be used as well, provided they offer means to store the information necessary for the operation of the system. Once a selection is made, this selection will be logged with the database server. The learning system 105 periodically queries the logfiles from the database server 104 to obtain performance records of advertisements and adjusts a set of display weights accordingly. These weights are stored in the database server 104, where the advertisement server 103 can access it during advertisement selection. Advertisers can contact a maintenance server 106 that allows direct access to the advertisement information stored in the database server 104.

Figure 10:
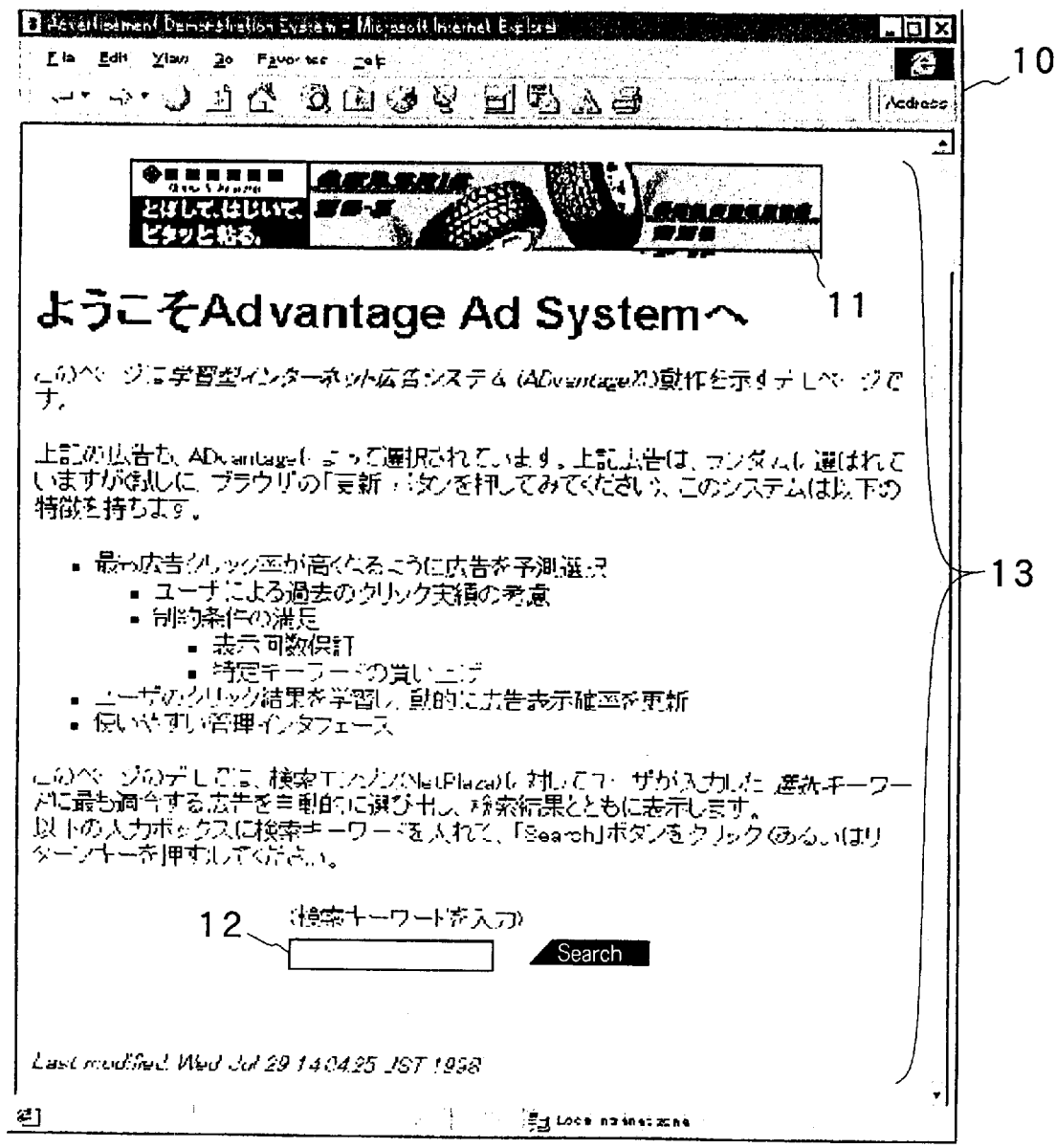
FIG. 10 is a view showing a sample interaction of a user with the publisher's content server containing a dynamically selected advertisement.
Figure 11:
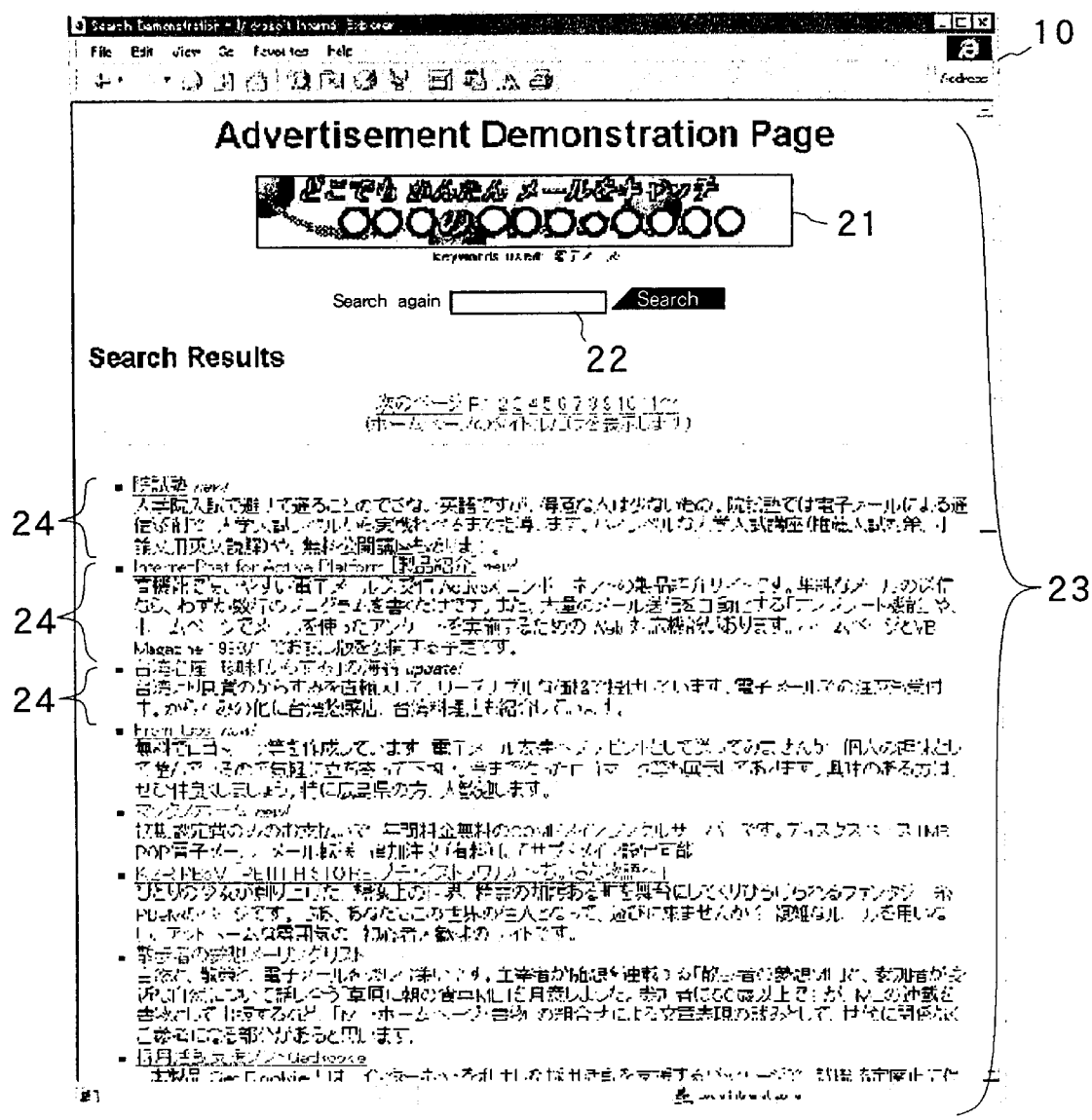
FIG. 11 is a view showing a sample result from the publisher's content server with a customized advertisement.

FIG. 10 shows a sample interaction of a user with the publisher's site. After connecting to the publisher's site using a web browser 10 as shown in a window on a user's display screen, the user is presented with a search page 13. The page contains a dialog box 12 where the user can enter a keyword to search the publisher's database. Note that the initial search page 13 already features a banner advertisement 11 that has been selected and supplied by the advertisement server 103 (FIG. 1), not the publisher's server 101. After submitting the search word, FIG. 11 shows a result page 23 returned by the publisher's server 101 to the user's browser 10. The page contains items 24 found by the publisher's server 101 and another search box 22 as well as another advertisement 21 which was customized for the respective search word used. Each item 24 consists of a link to a web page of the item 24 and a brief description regarding the item 24.

Figure 2:
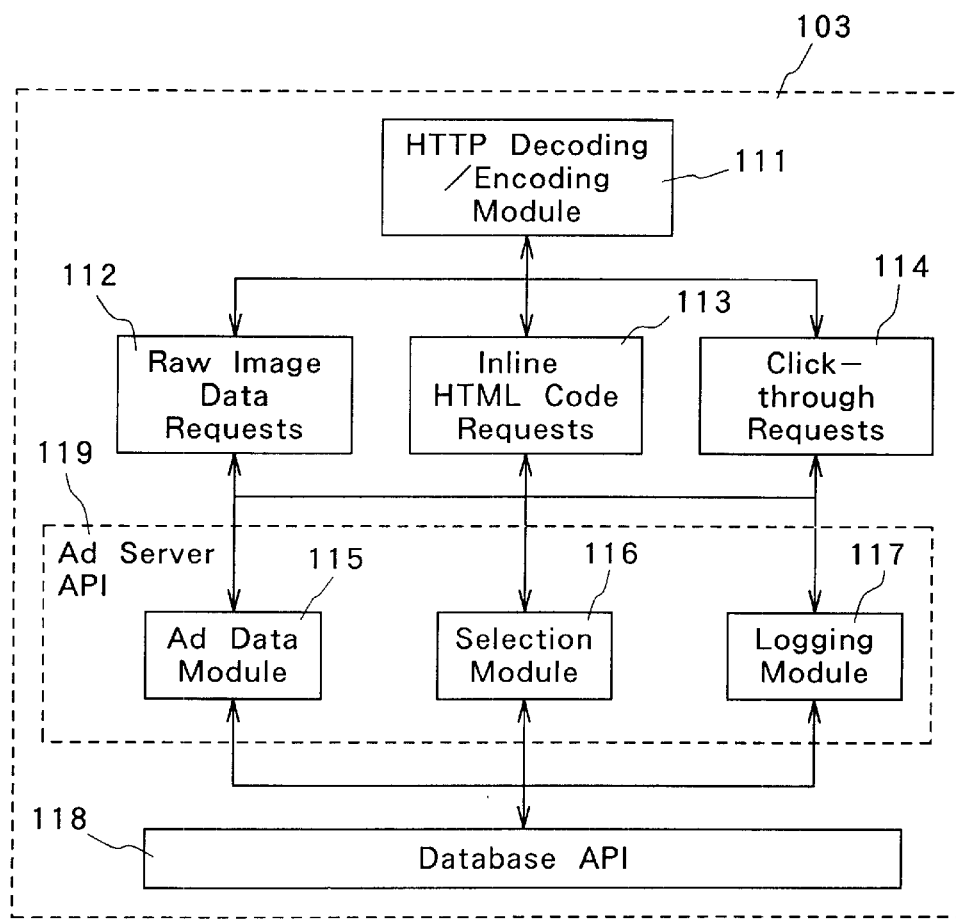
FIG. 2 is a block diagram of the advertisement server of the system shown in FIG. 1.

FIG. 2 shows the main modules that comprise the advertisement server (ad server) 103. A Hypertext Transfer Protocol (HTTP) (see T. Berners-Lee, R. Fielding, and H. Frystyk, *RFC1945: Hypertext Transfer Protocol—HTTP/1.0* IETF, May 1996) decoding and encoding module 111 handles the communication from and to the user client. Typically, a standard web server such as NCSA's httpd (NCSA=National Center for Supercomputing Application) or the Apache Web Server can be used. For persons skillful in the art it is easy to substitute one system for another, or even provide a custom implementation. Once a request has been decoded, one of three modules will handle the request: a module 112 for requests for image data, a module 113 for requests for HTML code, and a module 114 for click-through requests. These modules 112 to 114 will be explained in more detail below. Each module uses the advertisement server API (ad server API) 119 to perform the necessary computations and obtain relevant data from the database through the database API 118. The advertisement server API 119 offers functions in an advertisement data module 115 that provide access to advertisement data such as title, link URL (uniform resource locator) or image data; a selection module 116 that selects an advertisement ID (ad ID) to be displayed given a set of calling parameters; and a logging module 117 that provides logging and lookup functions for advertisement display and click-through statistics.

Figure 3:
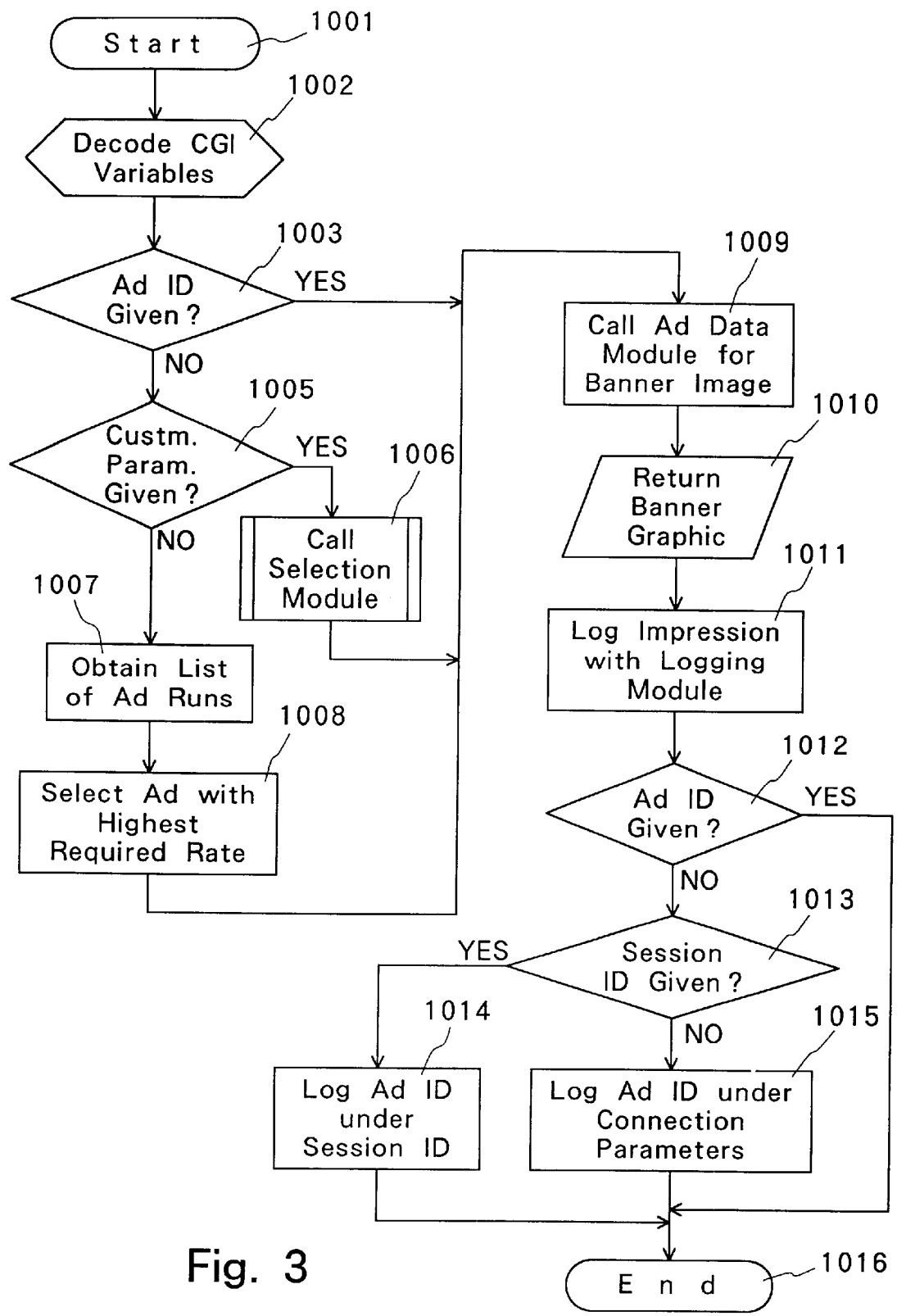
FIG. 3 is a flow chart showing the procedure for raw image requests.

FIG. 3 shows a flow chart of the script that handles requests for an advertisement image. Upon invocation by the web server in step 1001, the script will first decode the parameters that have been passed to the script in step 1002. The Common Gateway Interface (CGI) (as defined by the NCSA) is a standard protocol that allows client and server applications to exchange data over HTTP. CGI is implemented in almost all common web server implementations today, but persons skillful in the art will realize that it is easy to provide a custom implementation with similar support. The selection process can be shortcut with explicitly requesting a particular advertisement by its advertisement ID in step 1003. Otherwise the system tries to detect customization parameters in the request in step 1005. In the example shown in FIG. 11, the user's search word is a customization parameter, but it could also be a page ID or the name of the user's browser software. In case such information has been embedded into the request, the system will call the selection module 1006 to select a customized advertisement for the particular situation. If neither advertisement ID nor customization parameters are present, the system will simply obtain a list of currently active advertisements (i.e. advertisements that feature display constraints which do not prevent them from being shown under the current conditions) in step 1007 and select the advertisement with the highest required impression rate in step 1008. The impression rate of an advertisement is simply the number of times it should be shown on a certain web page or within a certain web site, and the amount of time left in the period it should be displayed in. This information is usually given by the advertiser and needs to be within the limits of total page accesses to the publisher's web site the advertisement will be shown on. Once an advertisement id has been determined in step 1003 and the procedure of selection module 1006 has been performed, the system can then call the advertisement data module 115 (FIG. 2) for obtaining the actual image data in step 1009. After returning this information to the client at step 1010 (this of course involves adhering to proper CGI output specification) the system will log the impression of the particular advertisement in step 1011 and the customization parameter used (if any). In case no advertisement ID had been explicitly specified (step 1012), additional bookkeeping is necessary to synchronize click-throughs at a later time. Should some form of session ID be embedded in the request in step 1013, the system assumes that the corresponding hyperlink has the same session ID embedded (this would be done on the publisher's side) and simply logs the advertisement ID under the particular session ID in step 1014. Otherwise the system has to use other means of identifying a user, such as the IP (Internet Protocol) address of the connection, and log the display accordingly in step 1015. Persons skillful in the art will realize that other forms of identification can be used instead, such as an advertisement server assigned user ID transmitted via cookies. After storing log information, execution ends at step 1016.

Figure 9A:
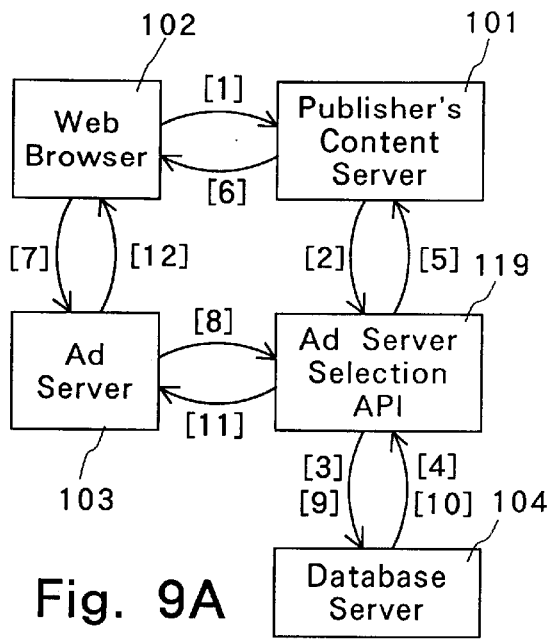
FIGS. 9A, 9B and 9C are diagrams showing the different data flows between a publisher system, a user and the advertisement system.
Figure 9B:
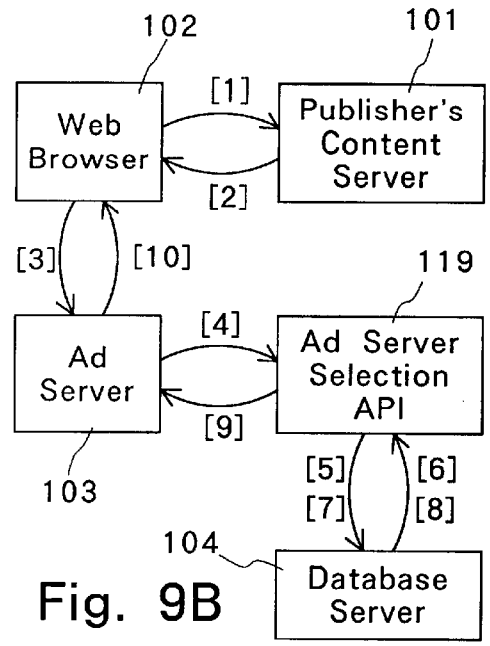

FIGS. 9A and 9B illustrate the corresponding data flow between the user's web browser 102, the publisher's content server 101 and the advertisement Server 103. FIG. 9A shows a case where the publisher has direct access to the advertisement server's API 119. After the user requests a page [1] from the content server 101, the server executes a script that will customize the requested page—for example by searching a database for a list of matching entries for a user query. In the process the publisher's script uses [2] the advertisement server selection API 119 to obtain an advertisement ID for the given customization parameters (for example the search keyword). The API 119 will query [3] to the database server and obtain the relevant information [4] from the database server 104, make a selection based on the customization parameter and return [5] the respective advertisement ID back to the calling script. This advertisement ID information can then be embedded into the HTML image tag that is placed on the results page where the advertisement will be displayed. After returning [6] the results back to the client, the user's web browser 102 will next try to download the referenced image data in the HTML page. Instead of pointing back to the Publisher's Content Server 101, the image tag will point to the advertisement server 103, which will be contacted [7] by the browser accordingly. As described in step 1003 in FIG. 3, the selection process 119 will find the embedded advertisement ID in the request [8] and directly contact [9] the database server 104 for the raw image data (step 1009 in FIG. 3). The returned data [10] is handed back [11] to the advertisement server 103 and transmitted [12] to the user's web browser 102, where it can then be displayed to the user on the results page.

Alternatively, the system can perform advertisement selection and delivery in a single process, as shown in the data flow diagram in FIG. 9B. After contacting [1] the content server 101, the corresponding script simple includes the customization parameters into the HTML image tag and returns [2] the results page to the user's web browser 102. The browser 102 again contacts [3] the advertisement server 103 for the actual image data, only this time including the customization parameters instead of the advertisement ID when starting the selection process [4]. As described in step 1005 in FIG. 3, the selection process 119 will find the embedded customization parameters to request and perform the selection after obtaining the relevant information [5], [6] from the database server 104. This advertisement ID information can then be used to directly contact [7] the database 104 for the raw image data (step 1009 in FIG. 3). Again, the returned data [8] is handed back [9] to the advertisement server 103 and transmitted [10] to the user's web browser 102, where it can then be displayed to the user on the results page. It is to be noted that in this case the chosen selection is at the same time noted in the database 104 under a client-identifying attribute, such as the IP address, a user ID assigned via cookies, or a session ID that was embedded in the request by the originating publisher. This information will later be required for proper click-through handling (see below).

Figure 4:
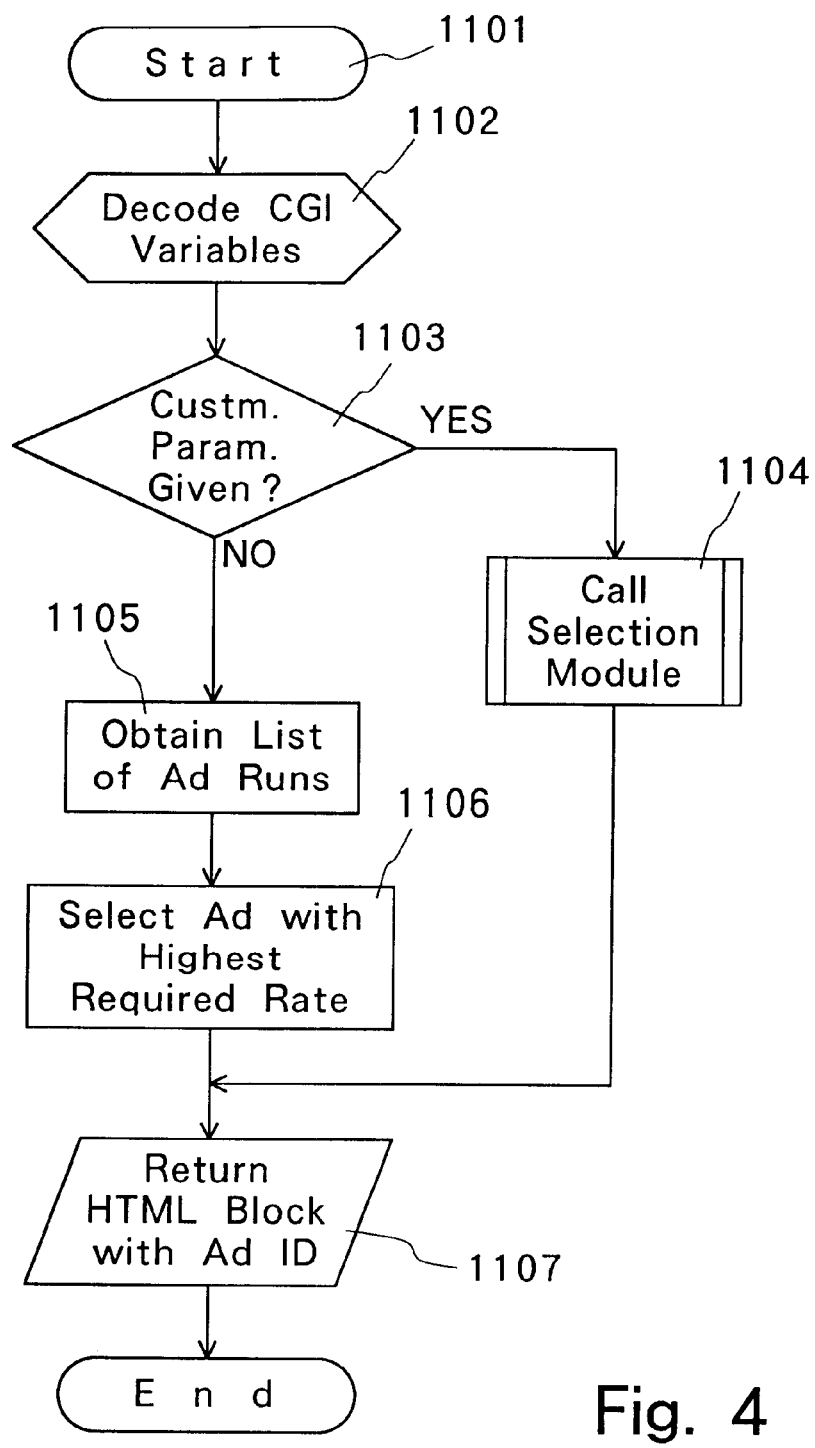
FIG. 4 is a flow chart showing the procedure for inline HTML requests.
Figure 9C:
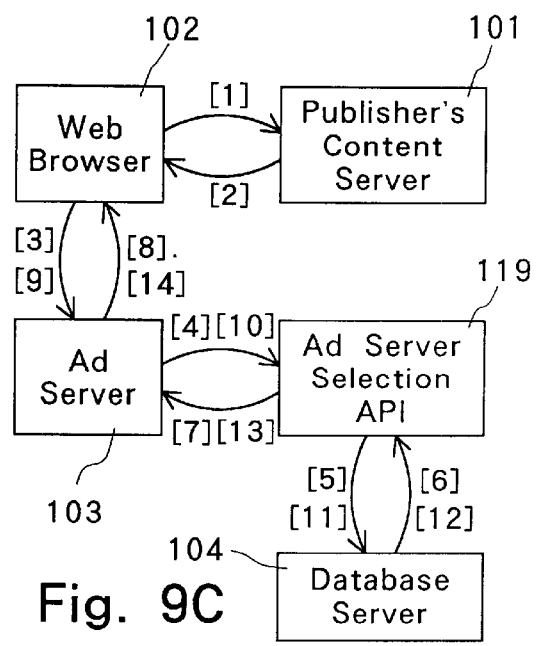

The advertisement server 103 also supports the usage of advanced HTML elements on the publisher side to facilitate state maintenance between advertisement display and click-through, alleviating the need for the above synchronization log file. FIG. 9C shows the dataflow for this case. After getting a request [1] from a client, the publisher's server 101 sends an HTML-embedding tag such as ILAYER or IFRAME (see Raggett, D. and Le Hors, A. and Jacobs, I., *HTML 4.0 Specification,* The World Wide Web Consortium, Apr. 24, 1998) together with the response [2], instead of the traditional image tag. The HTML-embedding tag points to the advertisement server 103 and contains the customization parameters that should be used by the advertisement system. Once the user's browser 102 encounters the embedding tags it will contact [3] the advertisement server 103 to fill in a snippet of HTML code at the position the original tag was placed in the output of the publisher's application. The advertisement server 103 will decode the request parameters as described in the flowchart in FIG. 4. Upon invocation at step 1101, the customization parameters are decoded in step 1102, and whether the customization parameters are given or not is discriminated in step 1103. If found, the parameters are given to the selection module in step 1104. If no customization parameters are present, the system will simply obtain a list of currently active advertisements in step 1105 and select the advertisement with the highest required impression rate in step 1106. Once an advertisement ID has been determined, the system simply returns a predefined HTML block containing the selected advertisement ID as an embedded parameter to the HTML image tag in step 1107. These steps correspond to events [4] to [7] in FIG. 9C. After returning [8], the HTML block back to the user's web browser 102, the advertisement server 103 will immediately be contacted [9] again by the browser 102 to fill in the actual image referenced in the HTML block. Events [10] through [14] are identical to events [8] through [12] of FIG. 9A: given the actual advertisement ID the system simply follows the flowchart shown in FIG. 3 for delivering the actual advertisement graphic given the advertisement ID.

Figure 5:
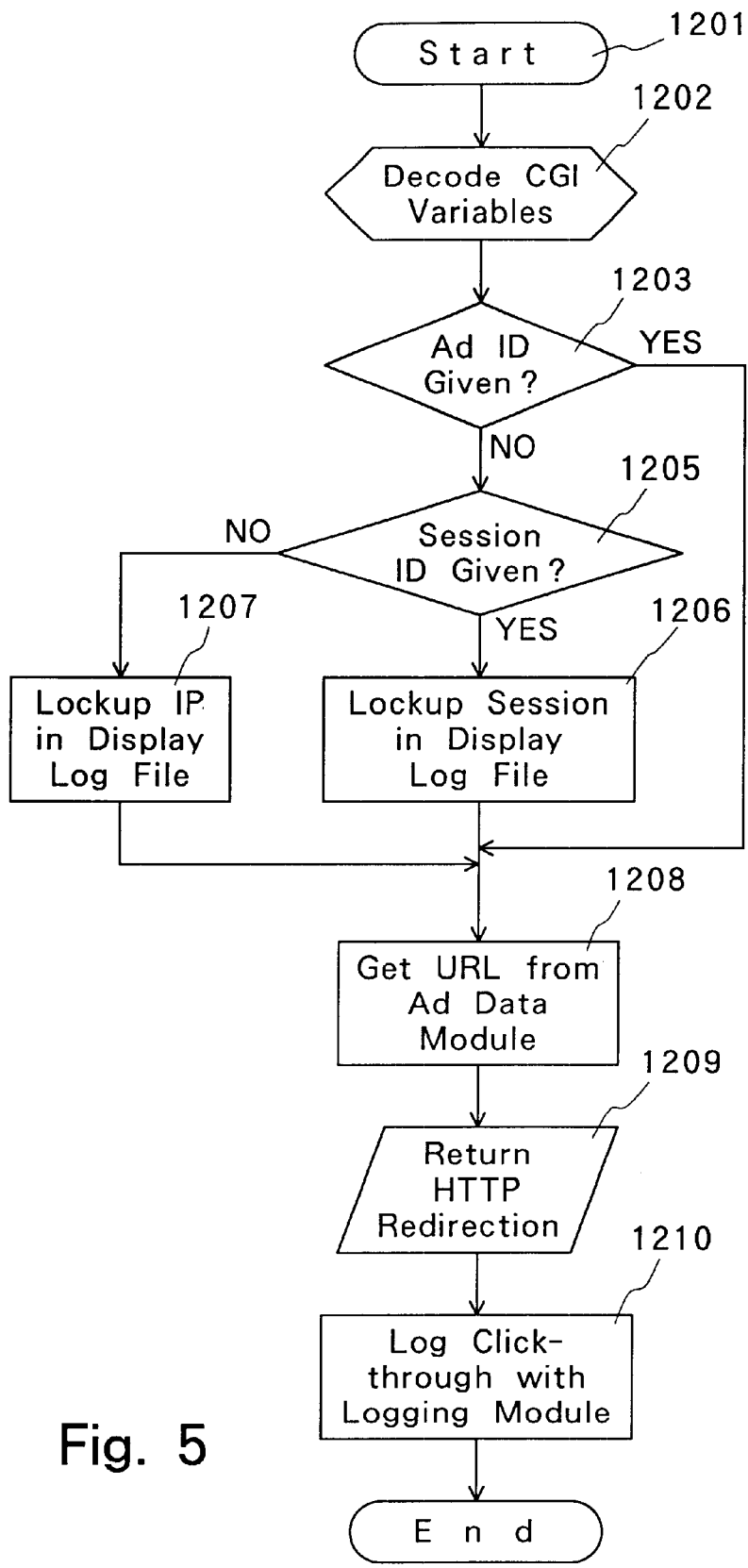
FIG. 5 is a flow chart showing the procedure for click-through requests.

Once the user clicks on an advertisement, a surrounding hyperlink will first send the user's browser back to the advertisement'server 103, where the click-through event is first logged and then a HTTP redirection command is issued that will point the user's browser to the web site of the corresponding advertiser. The flowchart of this process is shown in FIG. 5. Upon invocation at step 1201, the script first decodes the CGI variables in step 1202. Both the process shown in FIGS. 9A and 9C will embed the advertisement ID directly in both the image and the surrounding hyperlink tag. This is first tested for in step 1203 and can eventually shortcut the process at step 1208. Otherwise, the system tries to find an embedded session ID in step 1205 that could optionally be embedded into both tags by the process described in FIG. 9B. Should session information be available, the system looks up the corresponding advertisement ID in step 1206. Otherwise an alternative identification, such as the IP address is used in step 1207. In either case, the obtain advertisement ID is used to obtain the URL link information from the advertisement data Module in step 1208 and an HTTP redirection to the correct URL is sent back to the client in step 1209. Finally, the click-through event is logged together with the customization parameters used in step 1210 (this information can either be found in the request itself or in one of the logs).

Figure 6:
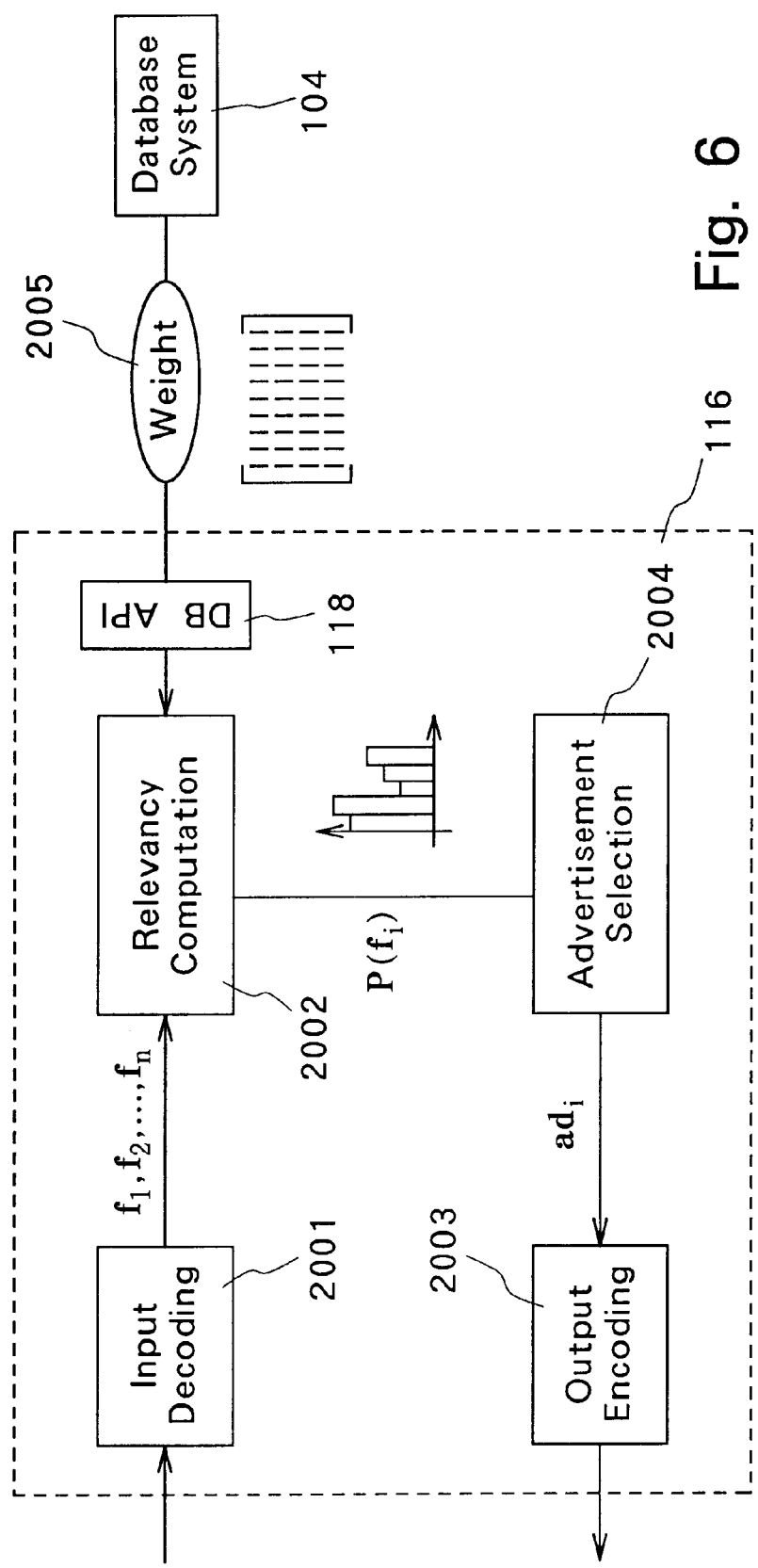
FIG. 6 is a block diagram of the selection module.

The structure of the selection module 116 (called in step 1106, FIG. 4) is illustrated in FIG. 6. A decoding module 2001 extracts the customization parameters $f_1, f_2, \ldots, f_n$. Using the extracted parameters, the database system 104 is queried through the database (DB) API 118 to provide a list of display probabilities for all available advertisements in the system, given the values of each customization variable. The list of display probabilities is encoded and outputted by an encoding module 2003. For each value of a customization variable, this list of probabilities for each advertisement has to add up to 1.0, i.e. in every case the system has to be able to choose one and only one of the available advertisements. After compiling this display distribution for all advertisements in a relevancy computation module 2002, the system chooses a random advertisement according to the given probabilities (weight) 2005. Once an advertisement ID (ad ID) has been chosen, it is returned to the calling program (advertisement selection module 2004). Recalling the request description above, this can then either be used to directly query the database for image data (event [7] in FIG. 9B), or to embed an advertisement ID parameter into a request string for an image (event [6] in FIG. 9A) or inline HTML element (event [7] in FIG. 9C). It is up to the calling program to log the proper information in the database (FIG. 3, step 1011).

Figure 7:
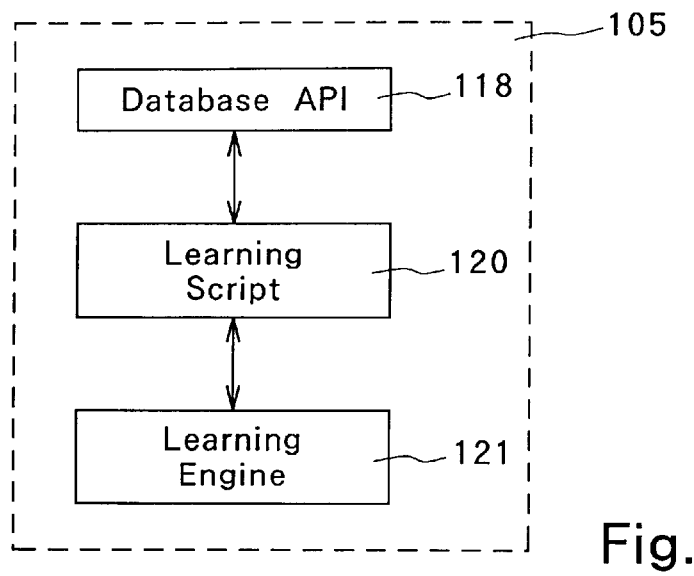
FIG. 7 is a block diagram of the learning system.

The learning process performed by the learning system 105 is completely separated from the on-line selection process. As shown in FIG. 7, a learning script 120 is called periodically which controls the input and output between the learning engine 121 and the rest of the system.

Figure 8:
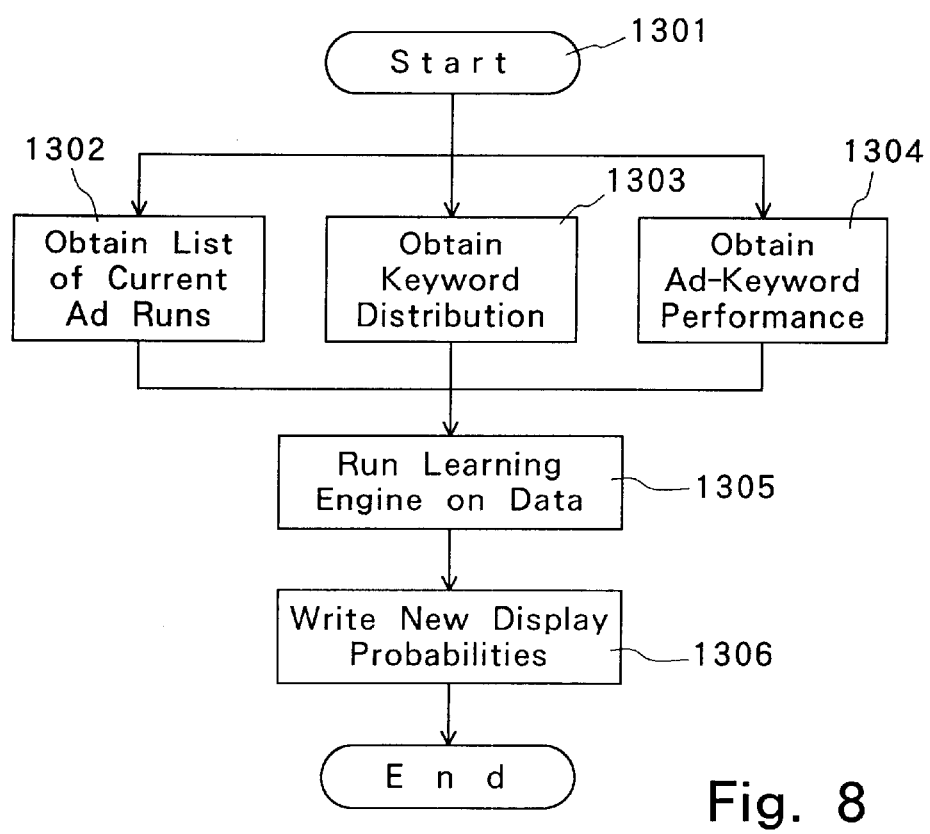
FIG. 8 is a flow chart showing the procedure of the learning script.

A flow chart of this process is shown in FIG. 8. The script will first contact the database server to obtain a list of current advertisements to show in step 1302. This list contains not only the ID of the advertisement, but also the requested daily impression rate and a list of manually configured customization parameters. The requested daily rate is computed as follows. Each advertisement is scheduled to be shown a certain number of times (called "impressions") over a certain period of time. This is called an advertisement "run". The daily rate is simply the number of impressions scheduled minus the number of impressions already shown, divided by the remaining time in the period this advertisement should be shown. The time can be expressed in days, hours or even seconds, as long as it is used consistently across all runs. The learning system will use only the relative sizes of the requested daily impression of all advertisements, not their absolute values. By using a finer shredded time parameter, the learning system is able to adjust the display probabilities more accurately in short time periods. The list of manually configurable customization parameters is simply an unordered list of attributes and their values together with a fractional value between and including 0.0 and 1.0. This fractional value can be set by the advertiser for each advertisement run to set minimum or maximum limits for the display probabilities the learning engine will compute.

The second item obtained by the learning script in FIG. 8 in step 1303 is the current distribution of customization parameters. This list contains attributes and their values, each with a number indicating the frequency with which this attribute value has been encountered in the poll period. In it's simplest embodiment, the poll period is simply a time span such as 7 days or 48 hours indicating the amount of time the system should go back in time while analyzing the log files of the system to assemble this distribution list. Smaller time spans will enable the learning system to better adjust to momentarily changes in usage patterns (for example, when a current news topic significantly changes a query word distribution for a couple of days only), while greater time spans will smooth out such changes. As an alternative, this time span can be exchanged for a dampening factor that will be applied to events that lie further back in time. A higher dampening factor will decrease the impact of past events, while a lower factor will weigh past experience higher.

Finally, the learning script (FIG. 8) will assemble performance statistics in step 1304 using the same poll period and method used to obtain the customization parameter distribution in step 1303. This performance statistics will contain a data point for each advertisement and customization parameter value combination. The data point consists of the number of impressions in the (possibly pro-rated) poll period and the number of click-throughs in the same period. Using this data, the learning system can evaluate the effectiveness of each value of the customization parameters in triggering a click-through for a certain advertisement. These three input files are collected by the learning script before calling the learning algorithm itself on these data files in step 1305. The present invention maps the problem of maximizing advertisement click-through in the presence of display constraints onto a constraint-problem that is solved using techniques from linear programming. Linear programming is a mathematical method for solving optimization tasks. It is frequently used to minimize costs or to maximize profits in manufacturing or transportation for example. To solve a problem, the real-world system is initially characterized by a limited number of system variables. With these system variables, a set of linear equations or inequalities are formulated to express restrictions on resources or requirements and to describe the quantity to be optimized. A solution to this model is any set of variables that does not violate the restricting system. An optimal solution is a solution with an optimal objective value. For purposes of describing and analyzing algorithms, the problem is often stated in the standard form $$\min\{c^T x : Ax = b, x \geq 0\} \quad (1)$$

where $x \in R^n$ is the vector of unknowns, $c \in R^n$ is the cost vector, and $A \in R^{m \times n}$ is the constraint matrix. The feasible region described by the constraints is a polytope, or simplex, and at least one member of the solution set lies at a vertex of this polytope.

The present invention computes advertisement display probabilities for each customization parameter value so as to maximize the advertisement's click-through rate in the presence of display constraints. For simplification, we will discuss the learning system using a single customization parameter W only. For persons skilled in the art it is easy to extend this method to include additional customization parameters S, T, U, V, etc. Let $A_1, \ldots, A_m$ denote the list of advertisements and let $W_1, \ldots, W_n$ denote the list of customization parameter values. From the list of current advertisements to be shown, the learning engine obtains the requested daily impression rate $h_j$ for each advertisement $A_j$. From the current distribution of customization parameters, the engine estimates the present probability $k_i$ for each customization parameter value $W_i$. From the performance statistics file, the engine estimates the click-through rate $c_{i,j}$ for each customization parameter value $W_i$ and each advertisement $A_j$. Then, the engine solves the problem of finding the display probabilities $d_{i,j}$ of advertisement $A_j$ for customization parameter value $W_i$ so as to maximize total click-trough rate $$\sum_{i=1}^{n} \sum_{j=1}^{m} c_{i,j} k_i d_{i,j} \quad (2)$$

under the following constraints:

$$\sum_{i=1}^{n} k_i d_{i,j} = h_j, \quad (j = 1, \ldots, m) \quad (3)$$

$$\sum_{j=1}^{m} d_{i,j} = 1, \quad (i = 1, \ldots, n) \quad (4)$$

If there is a list of manually configurable customization parameters, the engine adds the constraints on $d_{i,j}$ to the problem. For example, if the advertiser wanted advertisement $A_1$ to be shown at least 30% of the time when customization parameter W had value $W_0$ and 10% of the time when the value is $W_1$, the following two equations would be added by the system:

$$d_{0,1} \geq 0.3$$
$$d_{1,1} \geq 0.1$$

Several analytical methods are known to find an optimal solution to a linear model (see Chvatal V., *Linear Programming* W.H. Freeman and Company, New York 1983, or Stephen J. Wright, *Primal-Dual Interior-Point Methods* SIAM 1996). The current embodiment uses a method known as the simplex algorithm, as described in James K. Strayer, *Linear Programming and Its Applications,* New York, 1989, Springer-Verlag, but persons skillful in the art will realize that from the perspective of the overall system the actual algorithm is not important, as long as the input and output parameter are kept constant.

After having found an optimal solution for the problem, the learning system 105 returns a list of display probabilities $d_{i,j}$ for each advertisement $A_j$ and customization parameter value $W_i$. This information is converted into an intermediate, database compatible format by the learning script in step 1306 (FIG. 8) and directly uploaded into the database where it can be instantaneously used by the selection process described in FIG. 6.

While preferred embodiments of the present invention have been described using specific terms, such description is for illustrative purposes only, and it is to be understood that changes and variations may be made without departing from the spirit or scope of the following claims.

What is claimed is:

1. A method of providing an electronic advertisement from a plurality of electronic advertisements to a client system, the method comprising the steps of:
   decoding one or more customization parameters embedded in a request from the client system;
   querying a database for a list of display probabilities for relevant values associated with the one or more customization parameters;
   computing an overall display probability for the request based on a result of the querying step;
   selecting one of said plurality of electronic advertisements according to the overall display probability; and
   wherein said list of display probabilities is generated by calculating display probabilities for one or more customization parameters based on an associated number of click-throughs, from a plurality of users with respect to each of said plurality of electronic advertisements.

2. The method according to claim 1 wherein the list of display probabilities queried in the querying step are pre-computed by a learning system.

3. The method according to claim 1 wherein the relevant values associated with the customization parameters are stored in the database.

4. The method according to claim 1 further comprising the step of:

recording display and click-through statistics in the database for each set of customization parameters decoded in the decoding step with respect to the one electronic advertisement selected in the selecting step.

5. The method according to claim 1 wherein the querying step further comprises the steps of:

providing a learning system which pre-computes the display probabilities; and employing said learning system to periodically update the display probabilities.

6. The method according to claim 5 further comprising the steps of:

obtaining constraint data from the database for use by the learning system in updating the display probabilities;

obtaining performance data from the database for use by the learning system in updating the display probabilities; and obtaining one or more customization parameter distributions from the database for use by the learning system in updating the display probabilities.

7. The method according to claim 5, further comprising the step of:

storing a new list of display probabilities in the database based on a result of said learning system updating said display probabilities.

8. The method according to claim 7 wherein the new list of display probabilities stored to the database is calculated so as to maximize a total click-through rate with respect to (a) an estimated customization parameter distribution, and (b) an estimated click-through probability for one or more customization parameters and each of said plurality of electronic advertisements.

9. The method according to claim 8 wherein said total click-through rate is further maximized according to an associated constraint of a daily impression rate for each of said plurality of electronic advertisements.

10. The method according to claim 9 wherein said total click-through rate is further maximized under a custom display constraint set by an advertiser.

11. The method according to claim 1, wherein the display probabilities are calculated using linear programming.

12. The method according to claim 1, wherein the display probabilities are calculated using linear programming under one or more advertising campaign constraints.

13. An apparatus which provides electronic advertisements to a client system coupled to the apparatus, the apparatus comprising:

a database which stores a plurality of electronic advertisements and corresponding campaign information;

an advertisement server accessing said database for making one of said plurality of electronic advertisements available to the client system; and customization means connected to said advertisement server for performing a customization process which customizes the one electronic advertisement to be delivered to the client system; and wherein said customization means comprises:

means for calculating display probabilities for one or more customization parameters based on a number of click-throughs from a plurality users with respect to each of said plurality of electronic advertisement; and means for selecting the one electronic advertisement to be delivered based on the calculated display probabilities, the campaign information corresponding to said plurality of electronic advertisements, and one or more customization parameters received from the client system.

14. The apparatus according to claim 13 wherein the database stores a plurality of electronic advertisement titles, links and banner graphics, associated with said plurality of electronic advertisements.

15. The apparatus according to claim 13 wherein the database stores a plurality of advertisement campaigns associated with electronic advertisements.

16. The apparatus according to claim 13 wherein the database stores a list of customization parameters as a part of said corresponding campaign information.

17. The apparatus according to claim 16 wherein the database stores display statistics for each of said plurality of electronic advertisements, and wherein the database stores valid combinations of customization parameters from said list of customization parameters and associated values.

18. The apparatus according to claim 17 wherein the database stores click-through statistics for each of said plurality of electronic advertisements and for each of said valid combinations of customization parameters and associated values.

19. The apparatus according to claim 13, wherein the display probabilities are calculated using linear programming.

20. The apparatus according to claim 13, wherein the display probabilities are calculated using linear programming under one or more advertising campaign constraints.

* * * * *